Patented Apr. 18, 1944

2,346,993

UNITED STATES PATENT OFFICE 2,346,993

PERMANENTLY REFUSIBLE ZINC-CALCIUM RESINATE AND METHOD OF PREPARING SAME

Robert C. Palmer and Edwin Edelstein, Pensacola, Fla., assignors to Newport Industries, Inc., Pensacola, Fla., a corporation of Delaware No Drawing. Application October 7, 1942, Serial No. 461,234

11 Claims. (Cl. 260—105)

This application is a continuation-in-part of the application, Serial No. 297,108, by Robert C. Palmer, Anthony F. Oliver, and Edwin Edelstein, filed September 29, 1939, and entitled "Resinlike product and process of making the same."

This invention relates to zinc-calcium resinates and to methods of preparing such compounds by fusion reactions.

By a "fusion reaction" we mean a reaction carried out in a fusion mass consisting principally of the reacting compounds and their reaction products, in distinction from a reaction carried out in a normally liquid solvent medium that can be recovered after the reaction is completed.

The term "resinate" is herein applied generally to include the salts of any of the resin acids, for instance, abietic, pimaric or sapinic acids or polymers or isomers thereof. Rosin containing one or more of these resin acids may be reacted as disclosed hereinbelow with a zinc compound and with a calcium compound to form the corresponding zinc-calcium resin acid salts.

As far as we know, zinc-calcium resinates characterized by high zinc content, high calcium content, clarity, permanent refusibility, and capacity for forming stable, non-gelling solutions have heretofore not been prepared.

The term "permanent refusibility," as applied herein to resin-like products, means a capacity for being repeatedly fused and solidified, without any change in the characteristic appearance of the products, provided that the temperatures to which the products are subjected are kept below those temperatures at which substantial decomposition occurs.

By "stable, non-gelling solutions" we mean solutions of resin-like products in petroleum solvents and the like that do not gel when the solutions are heated to any temperatures short of their boiling points. By "gelling" we signify a thickening of a flowable solution by heating while a substantially constant concentration of solids is maintained therein, the solution finally becoming, in some cases, almost non-flowing at room temperature, and sometimes accompanied by the appearance of insoluble matter or precipitate.

By the term "clarity" as applied to our products we mean a transparency of the resinate itself due to a substantially complete absence of any unreacted zinc oxide, hydrated lime, or other zinc or calcium compounds used in preparing the resin-like products to which this invention pertains. Such unreacted zinc and lime compounds, if present, would, of course, tend to render the resin-like product obtained opaque rather than transparent. The transparency of the resinate itself is an important characteristic of our product, even though for some purposes opacifying agents may be incorporated therein.

In referring to resinates having a high zinc and a high calcium content, we do not mean to limit ourselves to basic or even to neutral zinc-calcium resinates but to include slightly acid zinc-calcium resinates. When the neutral, acid or basic character of a zinc oxide-hydrated lime-rosin reaction product is referred to, the designated character of the reaction product as a whole is meant. This is done to avoid controversy over whether the zinc-calcium resinate itself may not be present in the reaction product as a basic zinc-calcium resinate even when the reaction product as a whole has an acid or neutral character.

One reason why those skilled in the art heretofore have not been able to prepare clear, permanently refusible zinc-calcium resinates having a high zinc and calcium content and capable of forming stable, non-gelling solutions is the fact that ordinary rosin reacts only with difficulty, if at all, with zinc oxide and with hydrated lime and the like at temperatures falling below the decomposition temperature of the rosin. The reaction, even if initiated, does not go to completion but ceases long before a calculated neutrality has been effected. The acid zinc-calcium resinates of the prior art containing relatively small amounts of combined zinc and calcium are also characterized by infusibility and by the instability of their solutions in petroleum solvents.

We have found that the fusion reaction between rosin containing material and zinc oxide, hydrated lime, and the like can be carried so far as to produce even basic resinates if a suitable acid catalyst such as a low molecular weight fatty acid is incorporated with the fusion mass.

We have further found that the polymer content of the rosin containing material used for preparing the novel calcium-zinc resinates of this invention is a critical factor in preparing slightly acid, neutral or basic resin-like products characterized by clarity, permanent refusibility, and ability to form stable, non-gelling solutions, combined with relatively high contents of combined calcium and of combined zinc. Thus, if the rosin used as starting material contains less than about 7½% of a polymer such as the dimer, hydrated lime or the like should be reacted with the rosin used as starting material, before zinc oxide or the like is reacted with the rosin, or else a sufficient amount of calcium resinate snould first be incorporated with the rosin.

If this order of reaction or addition is not adhered to, the products obtained are not clear, permanently refusible and capable of forming stable, non-gelling solutions.

If the rosin used as a starting material contains more than about 7½% of polymer, zinc oxide or the like should preferably, but not necessarily, first be reacted with the rosin before hydrated lime or the like is reacted therewith.

The polymer content of about 7½% indicated in the preceding paragraphs is necessarily only an approximation to the actual value of the critical polymer content. The only method available for an estimation of the polymer content of a rosin is a molecular weight determination. A molecular weight determination can serve as a basis for the calculation of the polymer content of a rosin only when the normal molecular weight of the unpolymerized rosin fraction is known. Actually, the molecular weight of the unpolymerized fraction varies according to the nature of the starting rosin-containing material used and according to the method of preparation of the rosin-containing material as well as the nature of any treatment to which the rosin-containing material may have been subjected. The given figure of 7½% represents a value arrived at by estimating the amount of polymer required upon the basis of experimental data. A series of experiments were run in which various amounts of a commercial polymerized rosin known as "Nuroz," which may contain from 25 to 40% of polymer, were blended with natural "WW" wood rosin in various proportions. The resulting blends were used as starting materials in the preparation of resinates, the stability, refusibility and clarity of which were then determined.

There is apparently a definite relationship between the permanent refusibility of the novel resin-like products of our invention and the non-gelling of the petroleum solvent solution of these products, for gelling solutions are apparently formed only from those products which are not permanently refusible, and, conversely, all the permanently refusible solid resin-like products of our invention form stable solutions in petroleum solvents and the like without the addition of a stabilizing agent.

The novel resinates of our invention have physical properties resembling those of typical resins, being characterized, for instance, by a conchoidal fracture.

The value of our products lies not so much in their zinc content for its drier effect or in their calcium content for its hardening effect toward coating materials, as in making available novel, high melting point synthetic resin-like products for use as substitutes for or in conjunction with known synthetic resins, such as ester gum, alkyd and phenolic resins and their modifications. Our permanently refusible resin-like products impart added properties of hardness, through drying, gloss, improved pigment dispersion and other valuable characteristics to varnish, enamels, inks and similar coatings.

It is therefore an important object of our invention to provide novel, high melting point resin-like products of a permanently refusible character and capable of forming stable non-gelling solutions in petroleum solvents, the products being clear resinates of zinc and calcium high in zinc and calcium content and being substantially free of uncombined metal and having the valuable properties of imparting hardness, through drying, improved pigment dispersion and other desirable characteristics to varnish, enamels, inks and similar coatings.

Another important object of this invention is to provide a fusion method for the preparation of such resin-like products from heat treated rosin, catalytically polymerized rosin and the like.

A further important object of this invention is to provide a fusion method of making a substantially neutral or basic zinc-calcium resinate having permanently refusible characteristics and capable of forming stable, non-gelling solutions in petroleum solvents and the like.

Other and further important objects of this invention will become apparent from the following description and appended claims.

Suitable starting materials for our process include partially polymerized pine oleoresin or partially polymerized rosins such as heat treated rosins and catalytically polymerized rosins or pine oleoresin. Partial polymerization may be effected by heat treating gum or wood rosin in accordance with a method described and claimed in Logan Patents Nos. 1,643,276 and 1,807,483. According to these patents, rosin is heated at a temperature between 260° and 325° C. for a period between eight hours for the lowest temperatures and ten minutes for the higher temperatures. The amount of polymerization is greater the more prolonged the heat treatment.

Where "heat treated" rosin is herein referred to it will be understood to be rosin that has been subjected to heat treatment such as described in the aforesaid Logan patents, or an equivalent heat treatment.

Partial polymerization may also be effected by means of a catalyst in accordance with the methods of such patents as those to Schnorf, No. 2,074,192, Rummelsburg, Nos. 2,108,928, and 2,124,675, and to Morton, No. 2,017,866, or, preferably, in accordance with the method described and claimed in the Palmer and Bibb Patent No. 2,224,399, filed September 28, 1939, and granted July 1, 1941. Since the products so obtained are generally referred to as polymerized rosin, that term will be used herein to designate polymerized rosin produced by the action of a polymerization catalyst and containing a substantially greater proportion of polymers of a resin acid than that present in a heat treated rosin.

In general, a polymerized rosin such as the commercial polymerized rosin known as "Nuroz" contains some 25 to 40% of dimer. Throughout this specification and in the claims, where percentages are referred to, percentages by weight are intended unless otherwise specified.

A polymer content of about 7½% or more polymer is preferably treated differently from a rosin containing less polymer. Obviously any desired polymer content of any rosin used as starting material can be obtained either by a heat treatment or a polymerizing treatment of the rosin to be used as starting material or by blending with the rosin to be used as starting material heat treated or polymerized rosin in amounts sufficient to effect the desired polymer content in the rosin to be used as a starting material.

The starting materials described hereinabove are reacted by fusion with hydrated lime and with zinc oxide, hydroxide or carbonate, preferably at a temperature of from 200° to 300° C. A catalyst is added to the reaction mass, acetic acid being preferred. Other catalysts enumerated in the Romaine et al Patent No. 1,884,407 may be employed, however, especially catalysts selected from the group consisting of organic acids soluble in rosin at the reaction temperature whose acidity is due to a carboxylic acid radical, organic acids soluble in rosin at the reaction temperature whose acidity is of a phenolic nature, and salts of said acids capable of reacting with abietic acid to liberate said acids, such as formic acid, lactic acid, tartaric acid, citric acid, or a metal salt (including ammonium salts) of these and other carboxylic acids, in particular, fatty acids of low molecular weight.

Since a catalyst must be present at all stages of the fusion in order to have the reaction go to completion, it is essential to avoid the loss or destruction of the catalyst during the fusion process, if substantially all of the zinc compound and the lime is to be combined with the rosin, and if a clear resinate product is to be produced.

Several methods are available for avoiding the loss or destruction of the catalyst. Thus, if the reaction temperature is maintained, for example, at about 240° C. or above, the catalyst may be added with the lime or with the zinc compound. If acetic acid is used, the acid will react with the lime or zinc compound to form the corresponding acetate which is not volatile at the reaction temperature but may decompose gradually. To prevent the formation of lumps of acetate and to aid in the fusion reaction, the mixture of lime and acetate or zinc oxide and acetate may be wetted with barely enough liquid to form a slurry. An oil, such as a petroleum solvent, may be used that will volatilize during the fusion process. When such an oil is employed with the metal compounds, the quantity of oil employed is in no case sufficient to effect a reaction in solution rather than a fusion reaction. Water may also be used to form a slurry.

The amount of catalyst required to give a clear resin will obviously depend upon the manner in which the fusion reaction is conducted and upon the particular means adapted to insure the presence of a catalyst during the entire reaction, but from ½ part to about 1 part by weight for each 100 parts of rosin is usually sufficient.

Whether or not a clear, permanently refusible final product capable of forming a stable, non-gelling solution is obtained depends upon the amount of zinc compound and lime reacted with the rosin, upon the sequence of additions of zinc compound and lime, and upon the nature of the rosin used as starting material.

The order of addition as between the lime and the zinc compound depends upon the polymer content of the starting material employed. It is not usually possible, when starting with a rosin containing a substantial amount of polymer ranging up to about 7½%, to react as much as 6% zinc oxide without getting an infusible product in the fusion reaction, unless calcium resinate already is present. Calcium resinate provides the necessary stabilizing effect required for the preparation of a resinous product distinguished by permanent refusibility and by capacity for forming stable, non-gelling solutions. In the case of a rosin containing a substantial amount of polymer not in excess of about 7½%, we have found that when such rosin is reacted first with lime and then with a zinc compound, further reaction can be effected with an additional amount of lime.

In the case of a rosin containing at least about 7½% polymer, the presence of a stabilizing agent such as calcium resinate is not required to prevent the formation of an infusible resinous product. Hence the zinc oxide may be first reacted with the rosin and the lime added subsequently.

The acidity or basicity of the final product depends upon the proportions of the zinc oxide and hydrated lime employed. 1% of zinc oxide (ZnO) will theoretically drop the acid value of the rosin 13.78 points, while 1% of hydrated lime (Ca(OH)$_2$) will drop the acid value 15.13 points. In the case of reacting proportions of zinc oxide and hydrated lime, the percentages specified in the specification and in the claims are based on the weight of the rosin acid containing material.

In the case, for example, of a heat treated rosin having an acid value of 142, this rosin may be first reacted by fusion with 2.75% of hydrated lime dropping the acid value by about 42 points, and then with 6% of zinc oxide dropping the acid value by about 83 points, to yield a clear resin-like product containing zinc-calcium resinate. We find that if between 2.75 and 3½% of hydrated lime has been reacted with the rosin before the zinc compound is reacted with the rosin, about 6% of zinc oxide may then be reacted by fusion to form a clear refusible resinous product. However, the product will not be clear if more than about 9% of combined lime and zinc oxide have been reacted in this manner. About 6% of zinc oxide seems to be the maximum amount that can be reacted with the limed rosin to give a clear product. After 3% of lime and 6% of zinc oxide have been reacted with the rosin, more hydrated lime can be reacted with the rosin to give a clear resinate that may be neutral or basic. For instance, addition of 2% more lime yields a resin of calculated basicity equal to about 17 acid value. The amount of hydrated lime that can be added in this third fusion step is in general limited only by the extent to which the increased viscosity effected by such addition may make the product impossible to handle.

As pointed out hereinabove, when a catalytically polymerized rosin containing more than about 7½% polymer is used as starting material, the order of addition of the metal compounds preferably is different. The zinc oxide can then safely be added first and reacted completely with the rosin before the hydrated lime is added. In this way we have reacted 6% of zinc oxide with a chemically polymerized rosin of acid value 160 and then reacted 4% of hydrated lime with the rosin to produce a clear acid resin. Similarly, we have added 4% of hydrated lime to a chemically polymerized rosin to which 15% of zinc oxide had already been added, to produce a resin of a calculated basicity equal to 107 acid value and having a melting point of 168° C. (capillary tube).

In another example we first reacted a catalytically polymerized rosin such as the commercial product known as "Nuroz" having an acid value of 160 and melting point of about 77° C. (capillary tube) with 5.5% of zinc oxide and then reacted the product with 9.5% of hydrated lime. Further additions of lime could not be made at the reaction temperature of 300° C. because the reaction mass would then turn too viscous. The resin obtained was substantially clear, although all of the last 1% of hydrated lime (the lime having been added in 1% increments) probably did not completely react due to the high viscosity of the melted rosin. The reaction product had a capillary tube melting point of 204° C.

In the case of catalytically polymerized rosin, about 5 to 15% of zinc oxide may be reacted with the rosin in the first fusion step. Then at least 1% lime is reacted with the resin in the second fusion step. The upper limit for the amount of hydrated lime is set by the appearance of a viscosity so high that the melt cannot be handled, and will vary according to the amount of zinc oxide reacted with the rosin in the first fusion step.

On the basis of substantially complete reaction, the reaction products of rosin and 5, 6, 12, 13, and 15% of zinc oxide would contain about 3.8, 4.6, 8.8, and 10.8%, respectively, of combined zinc; and the reaction products of rosin and 1%, 3%, 4%, 5.5%, 9.5% of hydrated lime would contain about 0.5%, 1.6%, 2.1%, 2.8%, and 4.9% of combined calcium, respectively.

The following will serve as an example of carrying out the fusion process of the present invention.

100 parts of heat treated rosin are melted in a fusion kettle and about ½ to 1.0 part by weight of acetic acid added while the rosin is still at a relatively low temperature, say 130° C. About 3 parts by weight of hydrated lime are added to the molten rosin mass with stirring and the temperature increased with agitation until reaction is complete. At this point the temperature may be about 180° C. The desired amount of zinc oxide, say 6 parts by weight, is then added with agitation while continuing to raise the temperature and the reaction carried out until complete, as indicated by a clear melt. The final temperature may be as high as 300° C. The resulting resin-like product is permanently refusible and can be dissolved in petroleum distillates, such as mineral spirits, without gelling upon prolonged heating.

It will, of course, be understood that various details of the process may be varied through a wide range without departing from the principles of this invention, and it is, therefore, not the purpose to limit the patent granted hereon otherwise than necessitated by the scope of the appended claims. In these claims, the term "rosin" is used generically to include pine oleoresin.

We claim as our invention:

1. The method of preparing a zinc-calcium resinate in the form of a high melting point, permanently refusible, clear product capable of forming a stable, non-gelling solution, which comprises reacting, by fusion, a rosin containing a substantial amount of polymer with a zinc compound selected from the group consisting of the oxide, hydroxide and carbonate in an amount equivalent to at least 5% by weight of the rosin of zinc oxide, and with at least 1% by weight of the rosin of hydrated lime, said reaction being carried out in the presence of a catalyst selected from the group consisting of organic acids soluble in rosin at the reacting temperature whose acidity is due to a carboxylic acid radical, organic acids soluble in rosin at the reacting temperature whose acidity is of a phenolic nature, and salts of said acids capable of reacting with abietic acid to liberate said acids.

2. The method of preparing a zinc-calcium resinate in the form of a high melting point, permanently refusible, clear product capable of forming a stable, non-gelling solution which comprises reacting, by fusion, a rosin containing a substantial amount of polymer not in excess of about 7½%, first with from 2.75 to 3½% by weight of the rosin of hydrated lime, and then with at least 5% by weight of the rosin of zinc oxide, said reaction being carried out in the presence of a catalyst selected from the group consisting of organic acids soluble in rosin at the reacting temperature whose acidity is due to a carboxylic acid radical, organic acids soluble in rosin at the reacting temperature whose acidity is of a phenolic nature, and salts of said acids capable of reacting with abietic acid to liberate said acids.

3. The method of preparing a zinc-calcium resinate in the form of a high melting point, permanently refusible, clear product capable of forming a stable, non-gelling solution which comprises reacting, by fusion, at from 200° to 300° C., a rosin containing a substantial amount of polymer not in excess of about 7½%, first, with from 2.75% to 3.5% by weight of the rosin of hydrated lime and then with at least 5% but not more than 6%, by weight of the rosin of zinc oxide, said reaction being carried out in the presence of a catalyst selected from the group consisting of organic acids soluble in rosin at the reacting temperature whose acidity is due to a carboxylic acid radical, organic acids soluble in rosin at the reacting temperature whose acidity is of a phenolic nature, and salts of said acids capable of reacting with abietic acid to liberate said acids.

4. The method of preparing a zinc-calcium resinate in the form of a high melting point, permanently refusible, clear product capable of forming a stable, non-gelling solution which comprises reacting, by fusion, a rosin containing a substantial amount of polymer not in excess of about 7½% first with from 2.75 to 3.5% by weight of the rosin of hydrated lime, then with at least 5% but not more than 6% by weight of the rosin of zinc oxide, and finally with substantial additional amounts of hydrated lime insufficient to render the reaction mass too viscous for handling, said reaction being carried out in the presence of a catalyst selected from the group consisting of organic acids soluble in rosin at the reacting temperature whose acidity is due to a carboxylic acid radical, organic acids soluble in rosin at the reacting temperature whose acidity is of a phenolic nature, and salts capable of reacting with abietic acid to liberate said acids.

5. The method of preparing a zinc-calcium resinate in the form of a high melting point, permanently refusible, clear product capable of forming a stable, non-gelling solution which comprises reacting, by fusion, a rosin containing at least about 7½% polymer first with at least 5% but not more than 15% by weight of the rosin of zinc oxide and then reacting the fusion product with hydrated lime, in an amount at least equal to 1% by weight of the rosin but insufficient to render the reaction mass too viscous for handling, said reaction being carried out in the presence of a catalyst selected from the group consisting of organic acids soluble in rosin at the reacting temperature whose acidity is due to a carboxylic acid radical, organic acids soluble in rosin at the reacting temperature whose acidity is of a phenolic nature, and salts of said acids capable of reacting with abietic acid to liberate said acids.

6. The method of preparing a zinc-calcium resinate in the form of a high melting point, permanently refusible, clear product capable of forming a stable, non-gelling solution, which comprises reacting, by fusion, at from 200° to 300° C., a rosin containing at least about 7½% polymer with at least 5% by weight of the rosin of zinc oxide and then reacting the fusion product with hydrated lime, in an amount at least equal to 1% by weight of the rosin but insufficient to render the reaction mass too viscous for handling, said reaction being carried out in the presence of a catalyst selected from the group consisting of organic acids soluble in rosin at the reacting temperature whose acidity is due to a carboxylic acid radical, organic acids soluble in rosin at the reacting temperature whose acidity is of a phenolic nature, and salts of said acids capable of reacting with abietic acid to liberate said acids.

7. A method of preparing a zinc-calcium resinate in the form of a high melting point, permanently refusible, clear product capable of forming a stable, non-gelling solution which comprises reacting, by fusion, a rosin containing at least about 7½% polymer first with about 10% by weight of the rosin of zinc oxide and then with hydrated lime, in an amount at least equal to 1% by weight of the rosin but insufficient to render the reaction mass too viscous for handling, said reaction being carried out in the presence of a catalyst selected from the group consisting of organic acids soluble in rosin at the reacting temperature whose acidity is due to a carboxylic acid radical, organic acids soluble in rosin at the reacting temperature whose acidity is of a phenolic nature, and salts of said acids capable of reacting with abietic acid to liberate said acids.

8. The method of preparing a zinc-calcium resinate in the form of a high melting point, permanently refusible, clear product capable of forming a stable, non-gelling solution which comprises reacting, by fusion, a rosin containing at least about 7½% polymer first with about 15% by weight of the rosin of zinc oxide and then with hydrated lime, in an amount at least equal to 1% by weight of the rosin but insufficient to render the reaction mass too viscous for handling, said reaction being carried out in the presence of a catalyst selected from the group consisting of organic acids soluble in rosin at the reacting temperature whose acidity is due to a carboxylic acid radical, organic acids soluble in rosin at the reacting temperature whose acidity is of a phenolic nature, and salts of said acids capable of reacting with abietic acid to liberate said acids.

9. The method of preparing a zinc-calcium resinate in the form of a high melting point, permanently refusible, clear product capable of forming a stable, non-gelling solution which comprises reacting by fusion at from 200° to 300° C., a rosin containing at least about 7½% polymer with a zinc compound selected from the group consisting of the oxide, hydroxide and carbonate in an amount equivalent to at least 5% by weight of the rosin of zinc oxide, and with at least 1% by weight of the rosin of hydrated lime, said reaction being carried out in the presence of acetic acid.

10. A fusion produced, permanently refusible zinc-calcium resinate capable of being dissolved in a petroleum solvent to form a stable, non-gelling solution and containing a substantial amount ranging up to about 7.5% of a rosin polymer together with about 4.6% by weight of combined zinc and at least 1.6% by weight of combined calcium.

11. A fusion produced, permanently refusible zinc-calcium resinate capable of forming a stable, non-gelling solution and containing at least about 7.5% by weight of a rosin polymer together with from 3.8 to 10.8% by weight of combined zinc and at least 0.5% by weight of combined calcium.

ROBERT C. PALMER.
EDWIN EDELSTEIN.